US007551335B2

(12) United States Patent
Schilling et al.

(10) Patent No.: US 7,551,335 B2
(45) Date of Patent: Jun. 23, 2009

(54) OPTICALLY VARIABLE ELEMENT AND THE USE THEREOF

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 537 days.

(21) Appl. No.: 10/535,909

(22) PCT Filed: Nov. 7, 2003

(86) PCT No.: PCT/EP03/12452

§ 371 (c)(1), (2), (4) Date: May 20, 2005

(87) PCT Pub. No.: WO2004/048119

PCT Pub. Date: Jun. 10, 2004

(65) Prior Publication Data

US 2006/0056065 A1 Mar. 16, 2006

(30) Foreign Application Priority Data

Nov. 22, 2002 (DE) ................................ 102 54 500

(51) Int. Cl.
*G03H 1/00* (2006.01)
*G02B 5/18* (2006.01)

(52) U.S. Cl. .............................. 359/2; 359/567; 283/86

(58) Field of Classification Search ..................... 359/2, 359/567; 283/86
See application file for complete search history.

(56) References Cited

U.S. PATENT DOCUMENTS 4,417,784 A 11/1983 Knop et al.
4,455,061 A 6/1984 Case et al.
4,547,037 A 10/1985 Case et al.
4,895,790 A 1/1990 Swanson et al.
5,032,003 A 7/1991 Antes (Continued)

FOREIGN PATENT DOCUMENTS

DE 10054503 A1 6/2002

(Continued)

OTHER PUBLICATIONS

"Direct Writing of Continuous-relief Micro-optics", M.T. Gale, Micro-optics: Elements, systems and applications, herausgegeben von Hans Peter Herzig, Taylor & Francis, 1997.

(Continued)

*Primary Examiner*—Alessandro Amari
(74) *Attorney, Agent, or Firm*—Hoffmann & Baron, LLP

(57) ABSTRACT

The invention relates to an optically variable element which at least in surface portions has an interface embedded between two layers and which forms an optically effective structure, that interface having a free-form surface which appears three-dimensionally for a viewer. To emphasise that free-form surface the invention provides that the free-form surface is formed by a partial region of the interface, which is of a lens-like configuration and which produces a magnification, reduction or distortion effect. The invention also provides the use of such optically variable elements as a security element to prevent forgery of value-bearing documents or for articles to be safeguarded, in particular as part of the decorative layer arrangement of a transfer or laminating film.

20 Claims, 10 Drawing Sheets

U.S. PATENT DOCUMENTS

| | | | | |
|---|---|---|---|---|
| 5,105,306 | A | 4/1992 | Ohala | |
| 5,909,313 | A | 6/1999 | Lee et al. | |
| 6,016,225 | A | 1/2000 | Anderson | |
| 6,036,807 | A | 3/2000 | Brongers | |
| 6,324,004 | B1 | 11/2001 | Staub et al. | |
| 6,369,947 | B1 * | 4/2002 | Staub et al. | 359/574 |
| 6,906,681 | B2 * | 6/2005 | Hoppenstein | 343/853 |
| 6,906,861 | B2 | 6/2005 | Tompkin et al. | |
| 7,054,042 | B2 * | 5/2006 | Holmes et al. | 359/2 |
| 7,085,024 | B2 * | 8/2006 | Ishimoto et al. | 359/2 |

FOREIGN PATENT DOCUMENTS

| | | | |
|---|---|---|---|
| DE | 69620636 | T2 | 11/2002 |
| EP | 0375833 | B1 | 4/1990 |
| EP | 0 375 833 | B1 | 7/1990 |
| EP | 1513692 | A2 | 12/2003 |
| JP | 2-42401 | | 2/1990 |
| JP | 06-281804 | | 10/1994 |
| JP | 09-127322 | | 5/1997 |
| JP | 10-116016 | | 5/1998 |
| RU | 2111125 | | 5/1998 |
| RU | 2111550 | | 5/1998 |
| WO | WO9502200 | A | 1/1995 |
| WO | WO99/15919 | | 4/1999 |
| WO | WO0184193 | A | 11/2001 |

OTHER PUBLICATIONS

"Binary Optics Fabrication", M.B. Stern, "Micro-optics: Elements, systems and applications", herausgegeben von Hans Peter Herzig, Taylor & Francis, 1997.

Anlage 1—Select pages from http://www.cobum.com; "Coburn Graphic Films, Inc., —Multi-Lens®," (3 pages), dated Jun. 12, 2006.

Anlage 2—Select pages from http://www.cobum.com; "Multi-Lens—A Dazzling Array of Repeating Lens Configurations in Metalized and Translucent Film Format," (4 pages), not dated.

Anlage 3—Select pages from http://spectratek.net; Home page of Spectratek; Spectratek Technnologies; (3 pages), dated Jun. 12, 2006.

Anlage 4—Vorderseite; select pages from http://spectratek.net; Spectratek Technnologies; 1.2 Lens Array; (2 pages), dated Jun. 12, 2006.

* cited by examiner

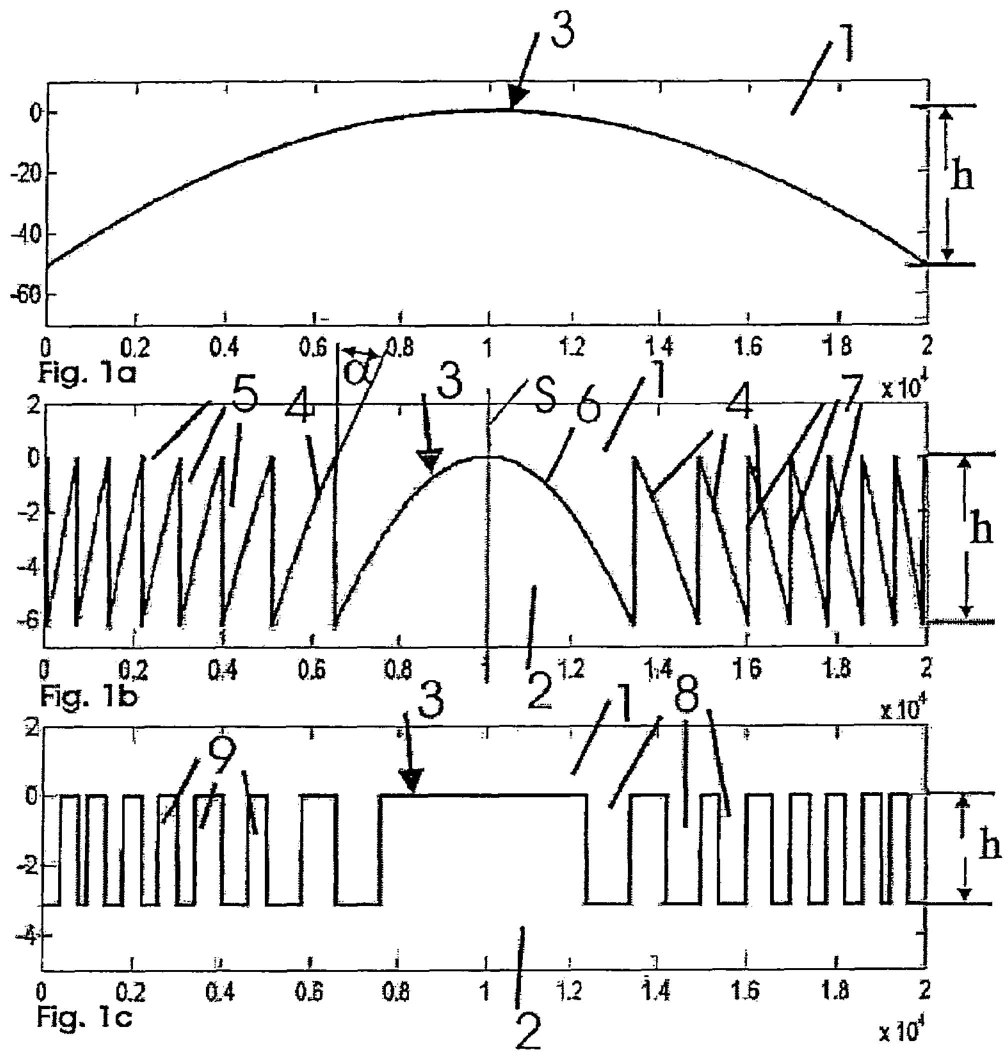
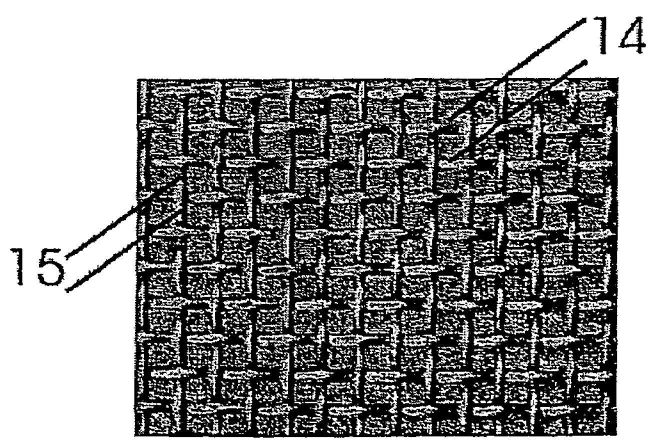
Fig. 10

OPTICALLY VARIABLE ELEMENT AND THE USE THEREOF

CROSS-REFERENCE TO RELATED APPLICATIONS

This application is a National Phase application of International Application No. PCT/EP2003/012452 filed Nov. 7, 2003, which claims priority based on German Patent Application No. 102 54 500.6, filed Nov. 22, 2002, which are incorporated herein by reference.

BACKGROUND OF THE INVENTION

The invention concerns an optically variable element which at least in surface portions has an interface which is preferably embedded between two layers of a layer composite and which forms an optically effective structure which spatially projects and/or is set back with respect to a (notional) reference surface, wherein the optically effective structure has at least one free-form surface appearing three-dimensionally for a viewer in the form of an alphanumeric character, a geometrical figure or another object.

Optically variable elements of the above-described kind are used for example as security elements for authenticating or identifying value-bearing documents, for example banknotes, cheques, etc, identity cards and passes, credit cards or other articles to be safeguarded. Such optically variable elements are also already used for decorative purposes, in which respect the boundary between use as a security element and use as a decorative element is frequently fluid. In that respect a particularly frequent requirement is that security elements also have a certain decorative effect, which applies for example when the situation involves guaranteeing the authenticity of certain articles, for example cigarettes, valuable cosmetic preparations and so forth, by corresponding elements.

For use as a security or decorative element, the known optically variable elements are generally applied to the corresponding substrate in the form of transfer films, in particular hot stamping films, or in the form of laminating films, in which case the interface forming the optically effective structure is then provided between two corresponding lacquer layers. In the case of transfer films those lacquer layers are part of the decorative layer arrangement which can be transferred from the carrier film on to the substrate, wherein instead of a lacquer layer it is also possible to provide an adhesive layer or the lacquer layer may have adhesive properties. In the case of laminating films the interfaces are in principle produced in the same way. The difference between laminating and transfer films however is that, in the case of laminating films, the lacquer and possibly adhesive layers serving as the decorative element remain on the carrier film when the laminating film is applied to a substrate. Finally it is also conceivable for packaging or decorative films to be basically like laminating films, but for those films, for example for packaging purposes, to be used as such without being laminated on to a substrate.

In this connection it is also already known for three-dimensional effects to be produced by way of suitable structuring of the interface between two layers, in particular lacquer layers, or in relation to air. For example cheque and credit cards are known, in which certain objects appear in different positions or perspectives in dependence on the viewing angle, or the impression is given to the viewer as though the corresponding object were standing three-dimensionally out of the surface of the carrier for the optically variable element.

Hitherto those three-dimensional effects were generally produced holographically, in which respect that procedure has on the one hand the disadvantage that a comparatively high level of apparatus expenditure is involved in production of the masters required for replication in corresponding layers. In addition holographically produced structures also suffer from serious optical disadvantages. In particular their shine is frequently defective. In addition, there is generally no possible way of increasing the attractiveness of a correspondingly optically variable element by achieving certain colour effects.

SUMMARY OF THE INVENTION

Therefore the object of the present invention is to propose an optically variable element which can easily be produced with the most widely varying processes known for the production of optically effective structures, which exhibits hitherto unknown effects from the point of view of the viewer and which in addition offers a designer a larger number of possible variations in respect of design configuration.

In an optically variable element of the general kind set forth, in accordance with the invention that object is attained in that the free-form surface is formed by a partial region of the interface, which partial region is of a lens-like configuration and produces a magnification, reduction or distortion effect and forms a free-form element.

While therefore hitherto the three-dimensional free-form surfaces, for example birds, letter or character combinations, pictures of people, mountains and so forth only appear in such a way as though either they would change their position upon a change in the viewing angle or they appear to float over the surface of the substrate, completely different optical effects are proposed in accordance with the invention, namely the optically variable element is of such a nature that the region forming the free-form surface, for example letters, digits but also any other objects, logos and so forth appears in such a way as though it were curved forwardly with respect to the surface of the substrate or would be set back, that is to say as though a curved surface were present in the region of the free-form surface. From the point of view of the viewer, that gives rise to a completely novel, hitherto unknown effect for the optically effective structure, namely that of a certain spatial depth, wherein in addition, with a suitable configuration and arrangement of the lens-like partial region of the interface, particularly characteristic optical effects can be achieved, which greatly enhance the recognition value and thus the identification effect of corresponding optically variable elements.

If the dimensions of the free-form surface are very small, that is to say if for example this involves an alphanumeric character with a very small line thickness, the effect according to the invention for an optically variable element can already be achieved by the free-form surface being of a configuration like a refractive lens structure. It is to be borne in mind however that the layers, between which the interface forming the optically effective structure is arranged, are usually lacquer layers which normally can only be of a very limited thickness. In order to be able to achieve the desired effect according to the invention, even when comparatively thin lacquer or adhesive layers are involved, it is desirable if the free-form surface is in the form of a diffractive free-form element with a grating structure whose grating depth is at most 10 μm and which has grating lines substantially following the contour lines of the free-form surface, wherein the spacing of the grating lines from the central region of the free-form surface towards the edge thereof continuously changes, that is to say either decreases or increases.

In a configuration of the optically variable element according to the invention the grating structure of the free-form element can be of such a configuration that the respective one flanks of the grating grooves extend in mutually parallel relationship and in approximately parallel relationship with a normal to the (notional) reference surface, while the angle of the respective other flanks of the grating grooves relative to the normal to the reference surface changes in a direction transversely with respect to the grating lines substantially continuously from one grating groove to another grating groove, wherein it will be assumed self-evident that the grating grooves are of a reducing cross-section.

The production of such grating structures is preferably effected by means of the so-called 'direct writing' process by means of laser or electron beam lithography machines, the use of which makes it possible to produce quite specific grating structures, that is to say, to actually accurately produce the desired optical effect for the free-form element.

It will be noted however that it is also possible for the above-mentioned grating structure with grating grooves whose flanks are arranged at an angle relative to each other to be produced in a different manner than by 'direct writing', more specifically when the flanks of the grating grooves, which extend at an angle to the normal to the reference surface, are of a stepped configuration, in which case the flanks—extending at an angle relative to the normal to the reference surface—are approximated in their optical effect by the surfaces forming the steps. When the flanks of the grating grooves are of such a configuration it is possible for example also to operate by means of masks, in which case the fineness of the stepped resolution of the (inclined) flanks depends on the number of masks used, that is to say the desired steps. In that respect, division of the corresponding flanks into four or eight steps is already sufficient for a large number of situations of use. When high quality demands are involved however it is also possible to provide for example sixty four steps, for the production of which a corresponding number of exposure operations is necessary, using different masks.

Production of the grating structure of the free-form element, which is very simple under some circumstances, can be achieved when the grating structure is a binary structure which has substantially rectangular grating grooves and grating lands, wherein preferably the configuration is such that the depth of the grating grooves of the grating structure of the free-form elements is approximately equal over the entire free-form surface, that is to say the change in the 'refractive power' (diffraction of the light into different directions) is only achieved by the width of the grating grooves and/or grating lands being suitably varied.

A particularity of the diffractive free-form elements formed by grating structures, in accordance with the invention, is that such diffractive lens structures—unlike refractive lenses—produce a different visual impression, in dependence on the light wavelength respectively used for illumination or viewing of the object, whereby once again it is possible to achieve particular design or security effects.

A further possible way of producing three-dimensionally appearing free-form surfaces according to the invention provides that the free-form surface is formed by a holographically produced free-form element, in which respect holographically produced lenses do however suffer from certain disadvantages in comparison with diffractive lens elements. For example, lens elements can be holographically produced at reasonable expense only if the configuration of the free-form surface is comparatively simple. In addition, because of their sinusoidal structure, holographically produced lenses do not appear too brilliant and frequently suffer from non-homogeneities, whereby the visual appearance which is to be produced by the lens can be adversely affected. In addition certain colour effects cannot be achieved with the desired high degree of freedom in terms of design configuration, with holographically produced lens elements.

It is basically conceivable for an optically variable element which essentially has a free-form surface designed according to the invention to be used as a security or decorative element. Advantageously however the free-form surface is part of an optically effective overall structure arrangement which, besides the free-form element, includes partial regions with optically variable elements which for the viewer produce different optical effects. For example a free-form element can be combined with the usual structures having an optical-diffraction effect, as are known for example, to produce motion effects, flips, changes between two different representations, and so forth. It will be appreciated that it is also possible to combine in one optically variable element a plurality of free-form elements, for example to make up a word or a number from letters or digits each forming its own free-form element, whereby then that gives the impression as though the word or the number were three-dimensionally emphasised in relation to the rest of the optically variable element. Attractive effects are also afforded if a plurality of free-form elements are so-to-speak interleaved with each other so that then, when different illumination or viewing directions are involved, the respective different free-form elements are visible. In principle there is here such a large number of possible combinations, for example including with matt effects, specular surfaces and so forth, that a more detailed discussion is not to be set forth at this juncture.

A possibility of particular interest is that of combining the optically effective structure with a thin-film arrangement completely or in region-wise manner, whereby it is possible to achieve specific colour changes, in dependence on the viewing angle. Further special effects can be achieved by the use of semiconductor layers.

It is further provided according to the invention that the interface forming the optically effective structure is provided at least region-wise with a reflection-enhancing coating which, if observation of the corresponding effect is to occur actually only with top light, that is to say in a reflection mode, is desirably formed by a metal layer. It will be noted that it is also possible, instead of the metal layer as the reflection-enhancing coating, to provide a dielectric layer having a refractive index which is suitably different with respect to the adjoining layers, or however also a suitably configured multi-layer arrangement or semiconductor coating.

It is possible to emphasise the free-form element in accordance with the invention in a simple manner if the reflection-enhancing coating is provided in register relationship with the at least one free-form element, wherein the register relationship can either be such that the reflection-enhancing coating is present only in the region of the free-form element, or however it is such that it is precisely in the region of the free-form element that there is no reflection-enhancing coating, but it is provided only in the region of the optically variable element, that surrounds the free-form element. That configuration can be highly advantageous for example when there are provided around the free-form element elements or structures which only produce very markedly discernible effects in reflection, for example motion effects, image changes and so forth.

The register relationship in respect of the reflection-enhancing coating, when a metal layer serves as the coating, can be easily produced by the per se known processes or region-wise demetallisation of the interface layer.

As can be seen from the foregoing description the optically variable element according to the invention can be used in different ways and for the most widely varying purposes. However the use of an optically variable element according to the invention as a security element in relation to forgery of value-bearing documents or for articles to be safeguarded is particularly advantageous, in particular also for the reason that the lens-like free-form elements provided according to the invention afford the possibility of introducing into the security element additional identification or safeguard features which differ from the features known hitherto for security elements in a novel manner and thus in a striking fashion from the point of view of the user of the corresponding document or the article to be safeguarded.

The use of an optically variable element according to the invention as a security element is advantageously effected in that the optically variable element is incorporated into the decorative layer arrangement, which can be transferred on to a substrate, of a transfer film, in particular a hot stamping film, or into the decorative layer arrangement of a laminating film, because that simplifies either transfer on to a substrate or the production of labels and so forth in a design configuration according to the invention.

BRIEF DESCRIPTION OF THE DRAWINGS

Further features, details and advantages of the invention will be apparent from the description hereinafter with reference to the drawing in which:

FIG. 1*a* diagrammatically shows a section through a refractive lens,

FIG. 1*b* shows a section through a corresponding diffractive lens with grating grooves of approximately triangular cross-section, FIG. 1*c* shows a diffractive lens similar to FIG. 1*b* with a diffractive binary structure, FIG. 10 is a plan view of an optically variable element with a weave pattern forming the free-form surface.

DETAILED DESCRIPTION OF THE INVENTION

Figure 2A:
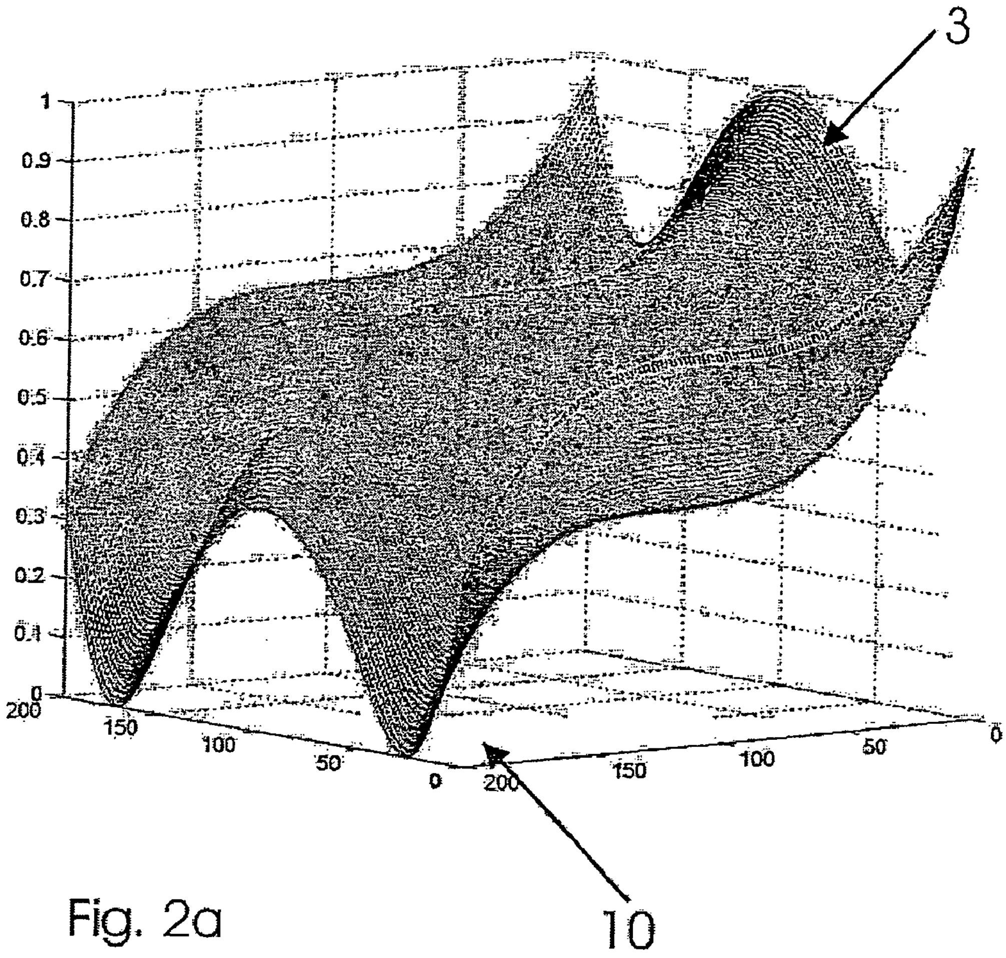
FIG. 2*a* shows a perspective view of a wave-like free-form surface.

The highly diagrammatic and relatively rough views in FIGS. 1*a* to 1*c* each show the partial region, which has a lens-like action, of an optically variable element according to the invention wherein formed between two layers 1, 2 which are generally lacquer layers is an interface 3 which is generally provided with a reflection-enhancing coating (not additionally shown in the drawing), for example a metallisation in the form of a vapour-deposited metal layer. In that respect, shown on the x-axis of FIGS. 1*a* to 1*c* is the dimension of the corresponding lens element in the respective direction, wherein the units of FIGS. 1*a* to 1*c* involve any assumed units as the precise size or the precise diameter of the lens elements is not an important consideration. In general terms the corresponding dimensions of the lens elements or the free-form elements formed by the lens elements however are between 0.15 and 300 mm, preferably between 3 and 50 mm.

Plotted on the y-axis in FIGS. 1*a* to 1*c* in each case is the thickness or the height respectively of the corresponding layers 1, 2 and the refractive surface or structure formed by the interface 3 respectively, the specified values being the phase difference in radians. When using a specific wavelength (for example 550 nm for the maximum sensitivity of the human eye), the actual geometrical depth can be calculated from that phase difference in known manner (also having regard to the respective refractive index).

If FIG. 1*a* is compared to FIGS. 1*b* and 1*c*, it can be see that the thickness of the optically variable element of FIG. 1*a* must be at least ten times as large as the thickness of the layer arrangement forming the optically variable element in FIG. 1*b* and even twenty times as great as the thickness of the layer arrangement in FIG. 1*c*. In this case, the fact that the layer arrangements of FIGS. 1*b* and 1*c* which form the optically variable element can be substantially thinner than that in FIG. 1*a* is due to the smaller overall height h of the structure which is determined by the interface 3 and which produces the lens effect and which extends only over a height which, when converted (for a system n=1.5/n=1 in the transmission mode) in FIGS. 1*b* corresponds approximately to double the wavelength and in FIG. 1*c* even only approximately the single wavelength. At any event the height h, that is to say the grating depth, is no greater than 10 μm, in the diffractive lens elements of FIGS. 1*b* and 1*c*.

As already mentioned the layers 1 and 2 are generally lacquer layers of suitable composition, wherein at least the lacquer layer which is towards the viewer (in the present case generally the layer 1) must be substantially transparent, although it will be noted that there is also the possibility of the lacquer layers being coloured while substantially preserving transparency. For certain situations of use one of the layers 1, 2 may also be an adhesive layer or at least a lacquer layer having suitable adhesive properties.

If the interface 3 is provided with a metallisation or another, strongly reflecting layer, the layer 2 can admittedly also be transparent but it may also be translucent or opaque. If in contrast the optically variable element according to the invention is to be used in the transmission mode, for example for covering over a visible feature on a substrate, the layer 2 must also be transparent. In that case the interface is not provided with a—generally opaque—metallisation. Instead, the refractive index of the two transparent layers 1 and 2 will be selected to be different in such a way (the difference in the refractive indices should preferably be at least 0.2) that, in spite of the use of two transparent layers, the optical effect produced by the interface 3 becomes sufficiently clearly visible.

If difficulties arise in that respect in implementing a sufficiently great difference in the refractive index of the layers, it would also be possible in accordance with the invention for the grating grooves of the free-form elements to be partially or substantially filled with a transparent material which has a sufficiently greatly differing refractive index before the continuous layer which faces towards the viewer is applied.

The master necessary for production of the lens element shown in FIG. 1*a* in a—basically known—replication process can be produced by mechanical precision removal processes with comparative ease in regard to the dimensions which are substantially larger in comparison with the structures of the lens elements of FIGS. 1*b* and 1*c*.

The diffractive grating structure of the lens element of FIG. 1*b* is usually produced in a so-called 'direct writing process', that is to say a process in which the material is removed in accordance with the desired profile by means of a laser or a photoresist is exposed in accordance with the desired profile by means of a laser or an electron beam lithography device and then the desired profile or the negative profile thereof is obtained by development of the photoresist. That procedure affords the advantage that very different grating structures and in particular grating cross-sections can be produced, for example including so-called blaze gratings for specific situations of use, in which respect it can particularly be provided that the angle a between the flanks 4 of the grating grooves 5, which flanks extend inclinedly in FIG. 1*b*, and a normal S on a notional reference surface, extending parallel to the x-axis, of the grating structure forming the lens element changes continuously from the paraboloidal central region 6 of the interface 3 forming the lens element in an outward direction—as is clearly apparent from FIG. 1*b*—and more specifically in such a fashion that, in the illustrated embodiment, the flanks 7 of the grating grooves 5, which are approximately parallel to the normal S, represent so-to-speak only discontinuities in an otherwise substantially steady lens profile which is formed by the successive inclined flanks 4 of the grating grooves 5 and the central paraboloidal portion 6 of the interface 3.

Lens structures of that kind and the manner of calculating same are basically described in the relevant literature in the art, and for that reason they will not be discussed in greater detail here.

In this respect mention should also be made of the possibility, in place of the inclined flanks 4 which are continuous over the height h as shown in FIG. 1*b*, of using a stepped arrangement in which the surfaces forming the steps approximate to the flanks 4 in respect of their optical effect. Grating structures of that kind can be produced both using a so-called direct writing process and also by way of suitable mask procedures, in which respect the number of steps can be varied in dependence on the desired result. In that case, division into four or eight steps is already sufficient for a large number of situations of use. When high quality requirements are involved however it is for example also possible to provide sixty four steps or a number of steps at a higher power of 2.

FIG. 1*c* diagrammatically shows a lens element formed by a so-called binary structure. In this respect the essential characteristic of the binary structure of FIG. 1*c* is that both the grating grooves 8 and also the grating lands 9 are each of substantially rectangular cross-section. Binary structures as shown in FIG. 1*c* are in that case usually produced using suitable masks, wherein in this connection the further particularity of the structure of FIG. 1*c* is advantageous, namely that the grating depth h of the grating structure is uniform over the entire lens element so that production of the associated masters does not involve either providing different periods of action for the means for removing the material nor having to operate with different levels of intensity of the means acting on the substrate through the corresponding mask.

There is also the possibility of producing suitable lens structures by means of per se known holographic processes, in which case that then gives structures of even smaller grating depth and of a substantially sinusoidal configuration, which however possibly leads to the disadvantages discussed above.

FIGS. 2*a*, 3*a*, 6*a* and 8*a* each show as a somewhat diagrammatic and greatly enlarged perspective view an illustration of a free-form surface in the form of a refractive lens element, that is to say a free-form element, wherein the Figures each only show a perspective view of the interface 3, which is present between the two layers 1, 2, of the free-form element, in order to clearly show the principle of the invention.

In that respect, refractive free-form elements of that kind which are sufficiently optically striking can only be achieved if either the thickness of the layers 1, 2 enclosing the interface 3 between them is sufficiently great or if the dimensions of the free-form surface parallel to the notional reference surface, for example in FIG. 2*a* the base surface 10, are sufficiently small, because indeed in the case of refractive free-form elements the height h of the lens element, as can be clearly seen from FIG. 1*a*, depends directly on the dimensions of the free-form surface in the direction of the x-axis.

Figure 3A:
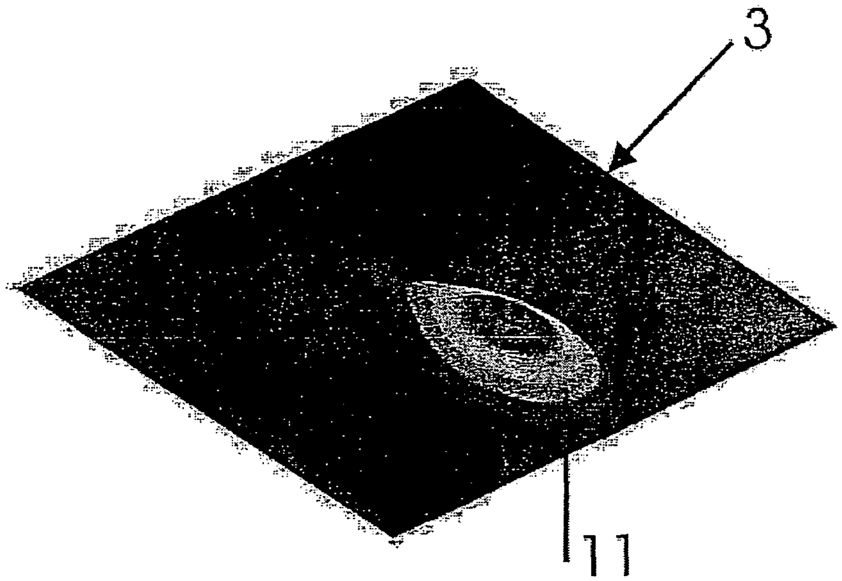
FIG. 3*a* is a perspective view of a free-form surface in the form of a drop as a refractive configuration.

FIG. 3*a* shows a drop-shaped free-form element 11, wherein as shown in FIG. 3*a* the free-form element 11 forming the drop-shaped free-form surface is so designed that the free-form surface appears to project upwardly beyond the otherwise flat interface 3. It will be appreciated that it would correspondingly also be possible to produce the impression as though the drop formed by the free-form element 11 were to project rearwardly (downwardly) beyond the surrounding interface 3.

Figure 6A:
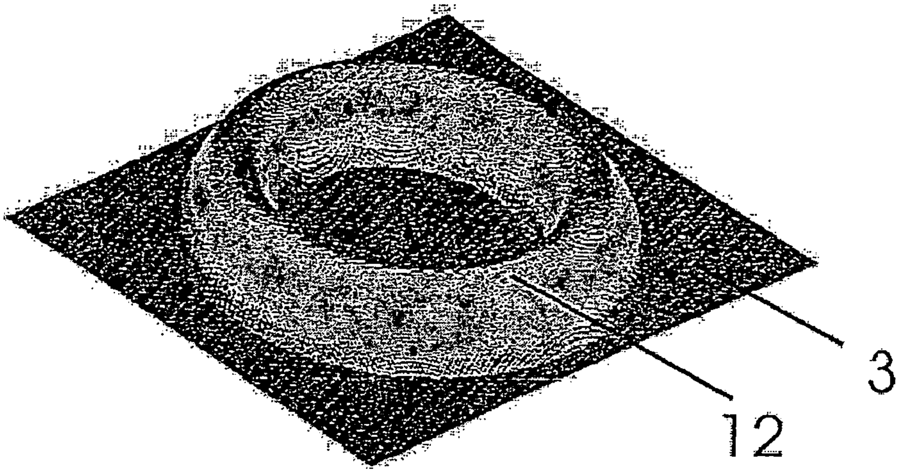
FIGS. 6*a* and 6*b* are illustrations corresponding to FIGS. 3*a* and 3*b* for an annular free-form surface.

FIG. 6*a* is a view similar to FIG. 3*a* showing an annular refractive free-form element 12 which for example can symbolise the letter 'O' or however can also have an only decorative effect.

Figure 8A:
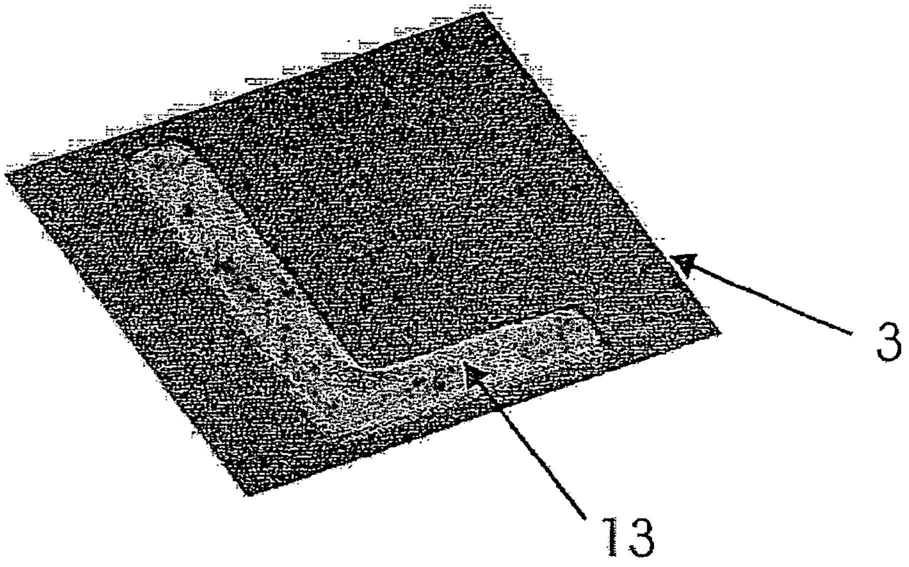
FIGS. 8*a* and 8*b* are illustrations of an L-shaped free-form surface corresponding to FIGS. 3*a*, 3*b* and FIGS. 5*a*, 5*b* respectively (drop and ring)

FIG. 8*a* correspondingly shows a perspective view of the interface 3 which is produced when the letter 'L' is illustrated by a refractive free-form element 13.

Figure 3B:
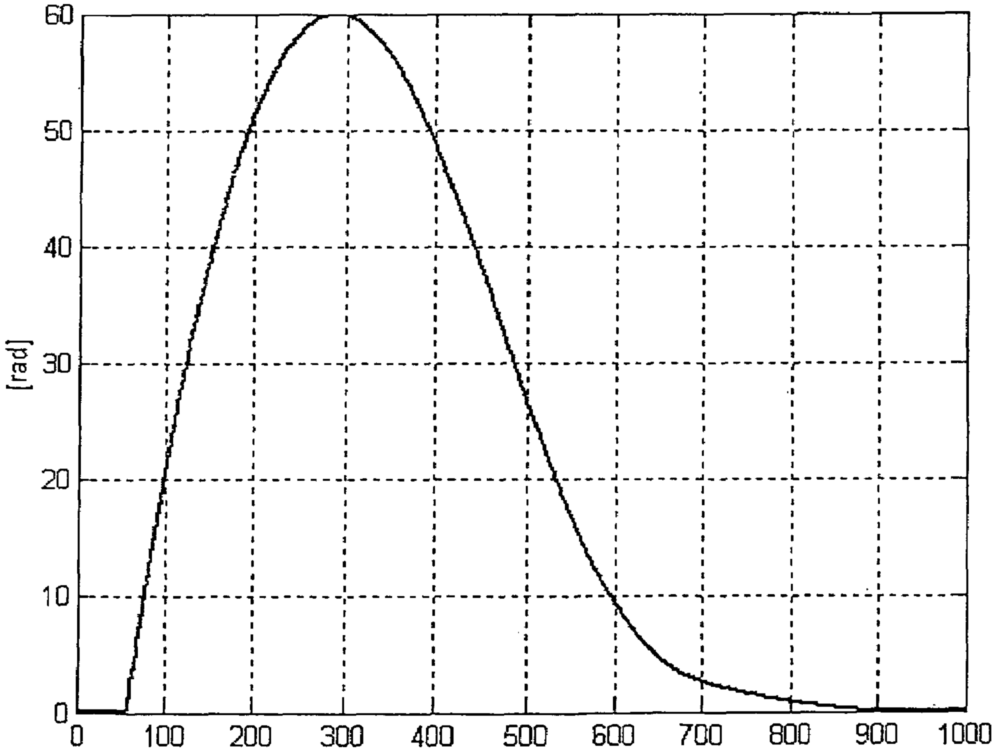
FIG. 3*b* is a graph representation of the configuration of the interface of the drop-shaped free-form surface of FIG. 3*a*, FIGS. 4*a* and 4*b* are views corresponding to FIGS. 3*a* and 3*b* but with the drop-shaped free-form surface in the form of a diffractive free-form element with grating grooves of approximately triangular cross-section.
Figure 6B:
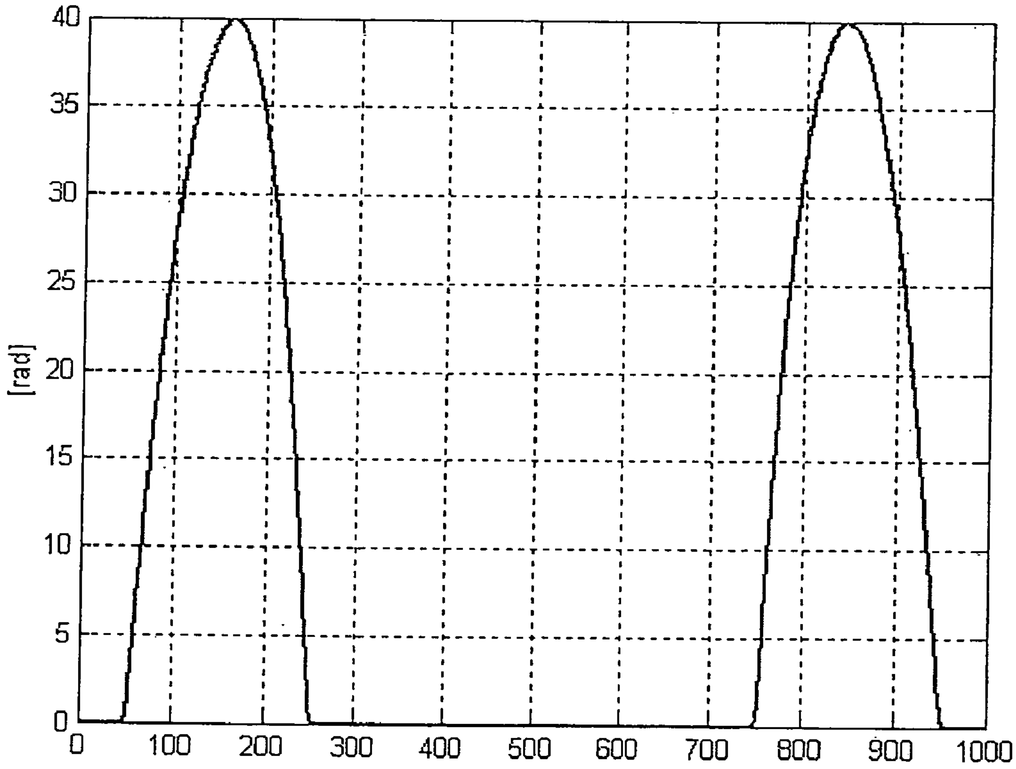
Figure 8B:
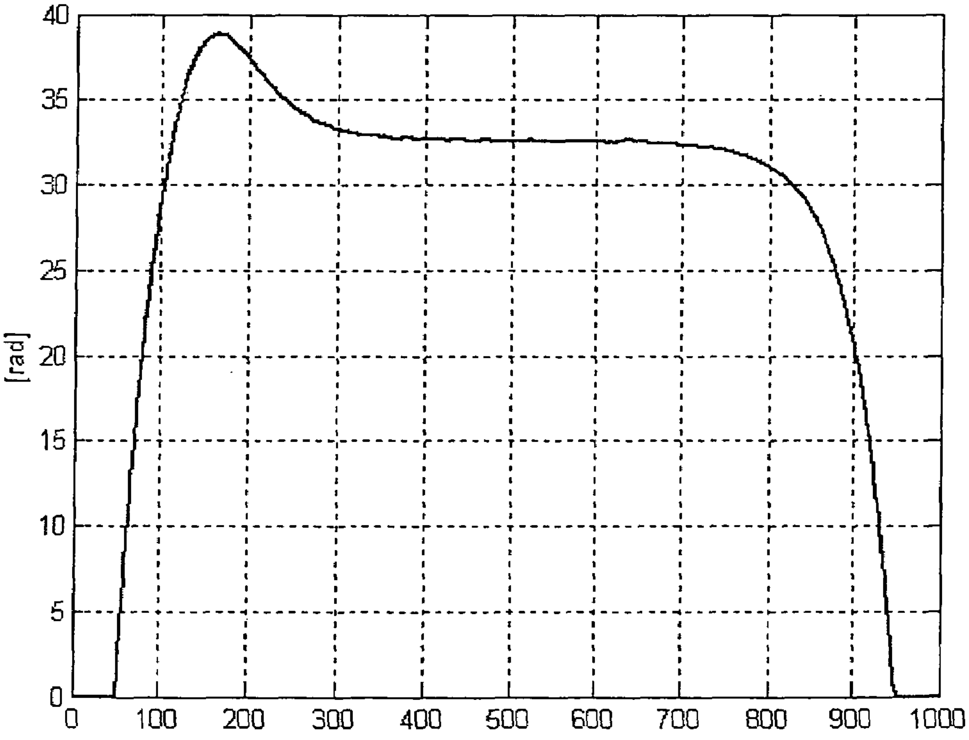

In the same manner as FIGS. 3*a*, 6*a* and 8*a*, FIGS. 3*b*, 6*b* and 8*b* each show—approximately in section perpendicularly to the notional reference surface—the configuration of the interface 3 in the case of the associated free-form elements 11, 12 and 13, wherein the dimensions of the graph views in FIGS. 3*b*, 6*b* and 8*b* again correspond to FIGS. 1*a* to 1*c*, that is to say any units are shown on the x-axis, while the deflection perpendicularly to the notional reference surface is shown on the y-axis in radians. In this case the profile in FIG. 3*b* extends along the axis of symmetry of the drop-shaped free-form element 11 in FIG. 3*a*, more specifically from bottom right in FIG. 3*a* to top left, that is to say from the rounded region to the tip of the drop. In regard to FIG. 8*b* the profile of the left-hand limb of the 'L' is also plotted in each case from bottom right to top left, thereby giving—because of the transverse limb of the 'L' which branches off at bottom right—the increase in height in the left-hand region in FIG. 8*b*.

It is interesting now to compare the diffractive grating structures serving as free-form elements to the refractive structures of FIGS. 2a, 3a, 6a and 8a.

Figure 2C:
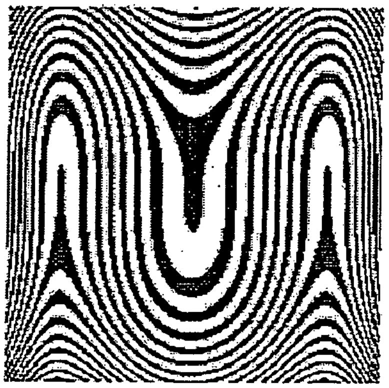
FIG. 2*c* shows a plan view corresponding to FIG. 2*b* but in the case of a free-form element with a diffractive binary structure as shown in FIG. 1*c*.
Figure 2B:
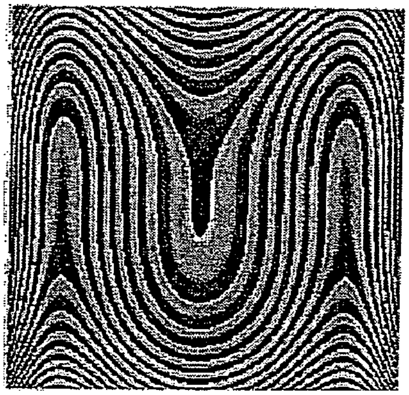
FIG. 2*b* shows a plan view in highly diagrammatic and rough form showing the free-form surface of FIG. 2*a* in the form of a diffractive free-form element with a grating structure as shown in FIG. 1*b*.

FIG. 2b is a diagrammatic and greatly enlarged plan view of the free-form surface of FIG. 2a, and more specifically in a direction of view approximately perpendicularly on to the reference surface 10, with the free-form surface being in the form of a diffractive free-form element with a grating structure having grating lines which substantially follow the contour lines of the free-form surface, wherein the spacing of the grating lines from the central region of the free-form element towards the edge thereof continuously changes. A comparison of FIGS. 2a and 2b also shows in this connection that the term 'contour lines of the free-form surface' in accordance with the invention does not necessarily mean the actual boundary of the free-form surface. Rather, it is important for the grating structures to extend in such a way that the spatial configuration of the free-form surface, for example the differing spacing of the free-form surface of FIG. 2a from the notional reference surface 10, is also suitably taken into consideration.

FIG. 2c is a view also corresponding to the view in FIG. 2b showing a plan view of the structure of the free-form surface of FIG. 2a, when the lens element is not formed as in FIG. 1b by a grating structure with continuously changing grating grooves but instead thereof the grating structure is a binary structure, as is basically shown in FIG. 1c.

Figure 7A:
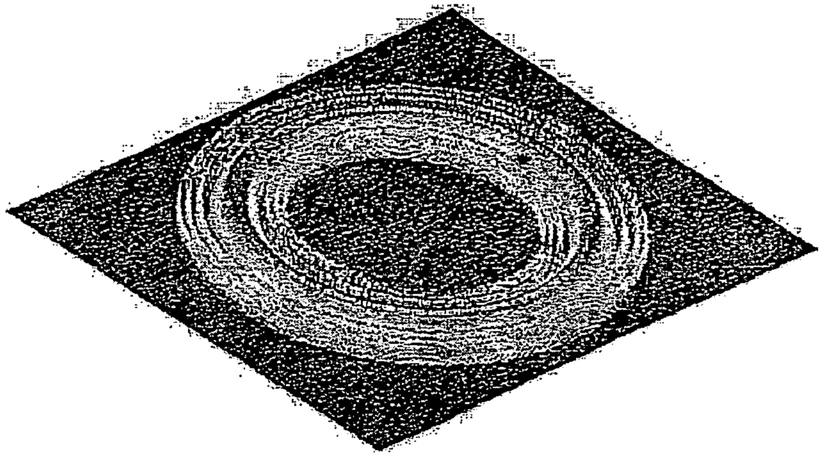
FIGS. 7*a*, 7*b* and 7*c* are illustrations in respect of the annular free-form surface corresponding to FIGS. 4*a*, 4*b* and 5*b* of the drop-shaped free-form surface.
Figure 9C:
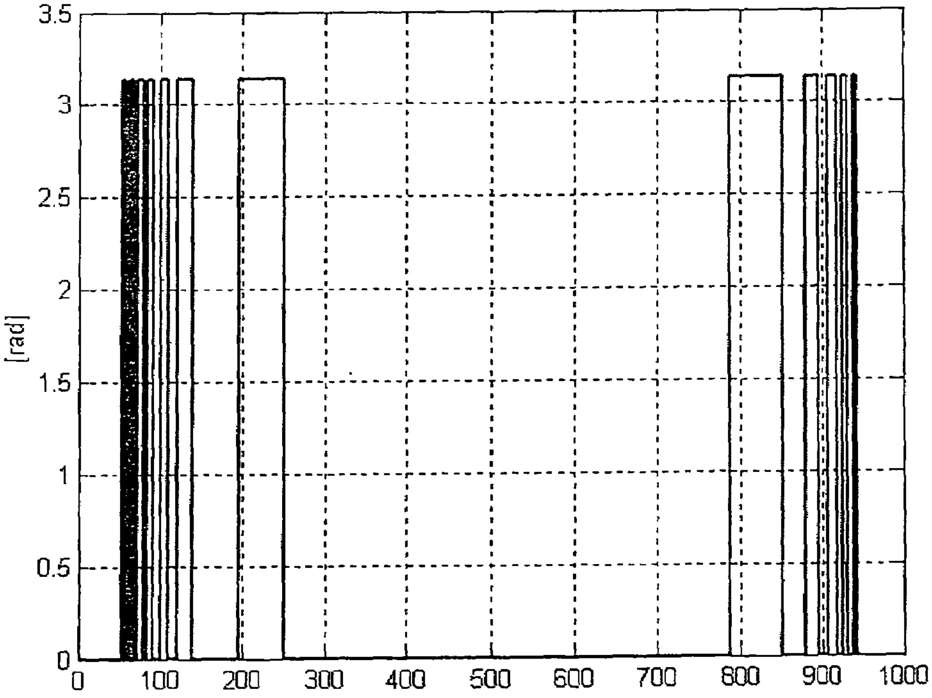
FIGS. 9*a*, 9*b* and 9*c* are illustrations corresponding to FIGS. 7*a*, 7*b* and 7*c* for the L-shaped free-form surface.
Figure 9A:
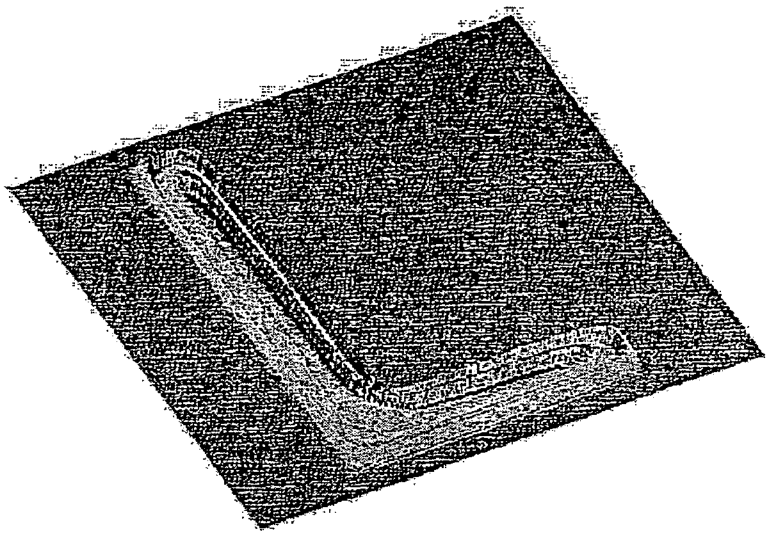

FIGS. 4a, 7a and 9a again basically show plan views corresponding to FIGS. 3a, 6a and 8a, of the drop-shaped free-form element 11, the annular free-form element 12 and the L-shaped free-form element 13 respectively, wherein however the free-form element in each case is again not in the form of a refractive lens but in the form of a diffractive grating structure involving the basic configuration shown in FIG. 1b.

Figure 4A:
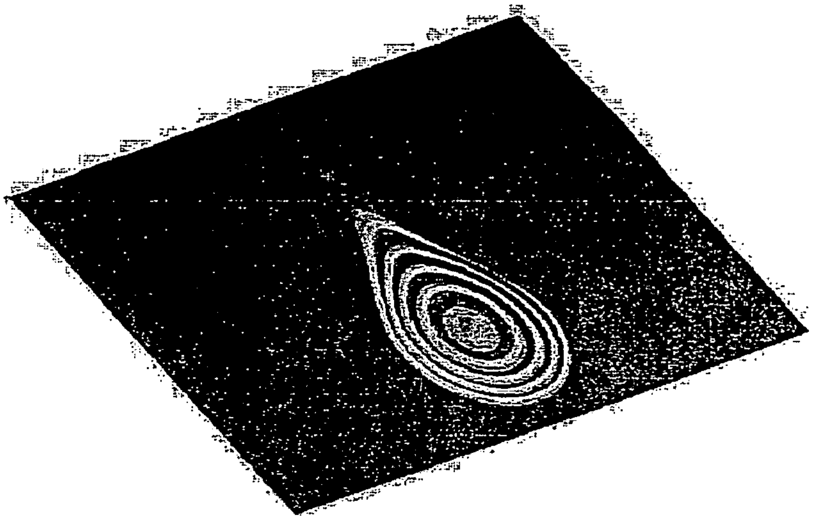
Figure 4B:
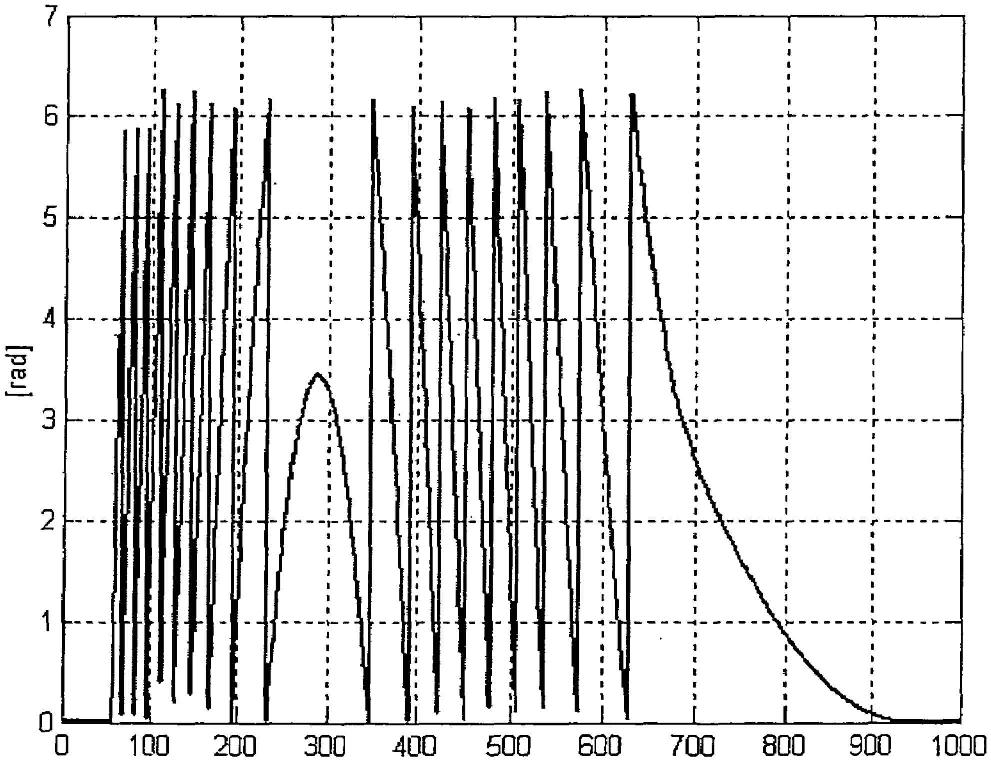
Figure 7B:
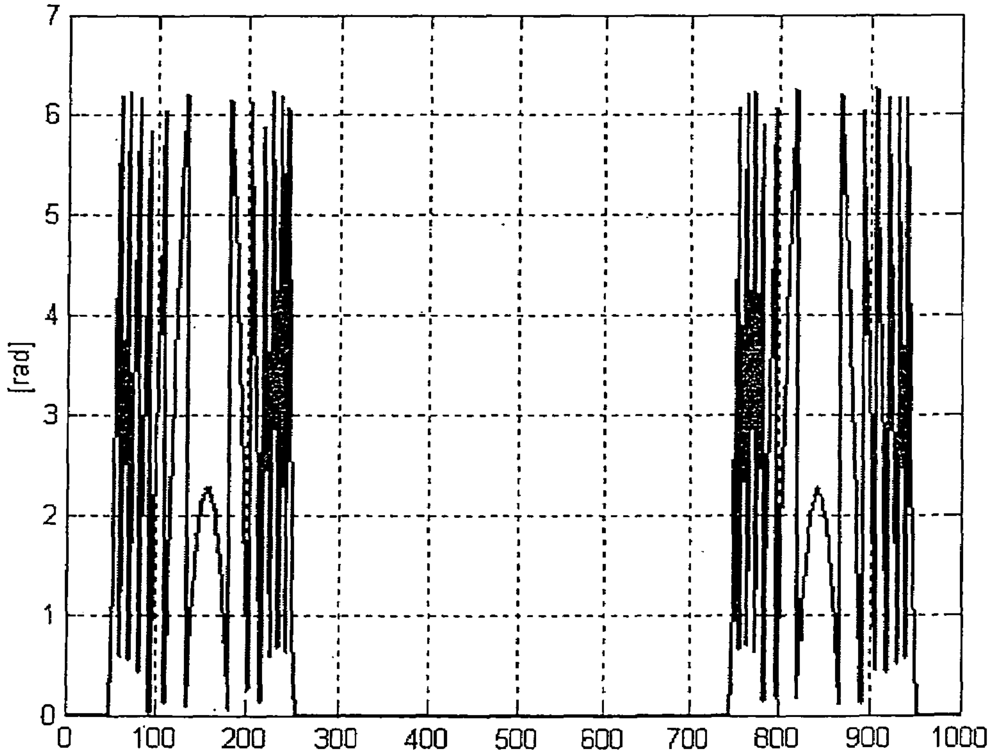
Figure 9B:
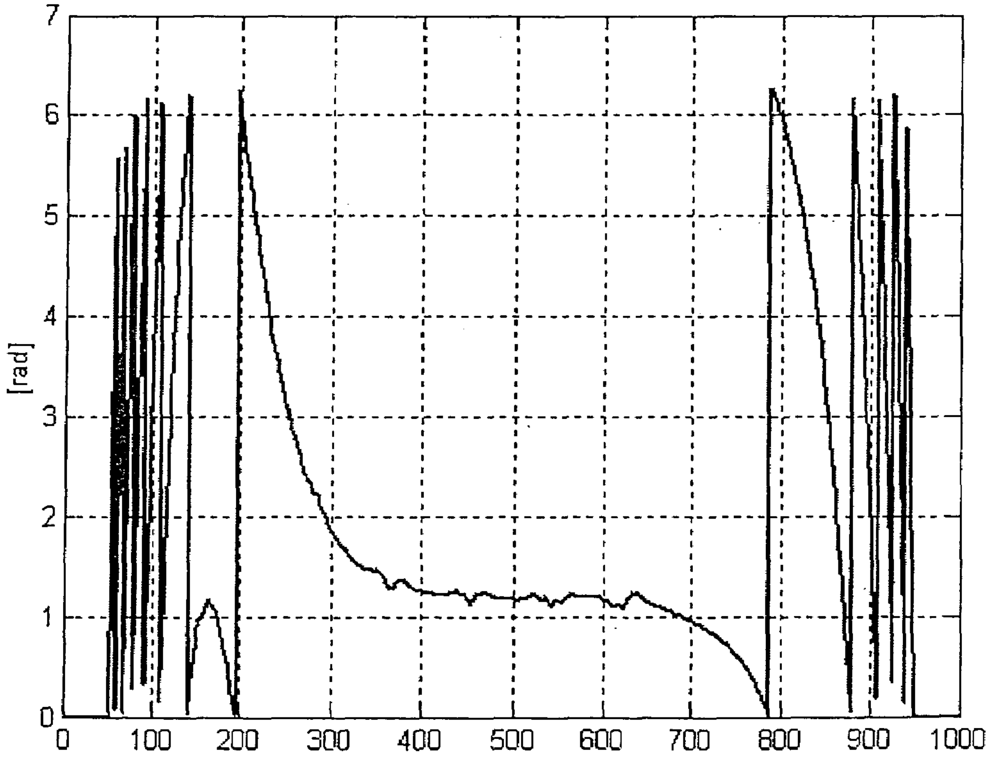

The sections or height profiles corresponding to FIGS. 3b, 6b and 8b are correspondingly shown in FIGS. 4b, 7b and 9b.

Figure 5A:
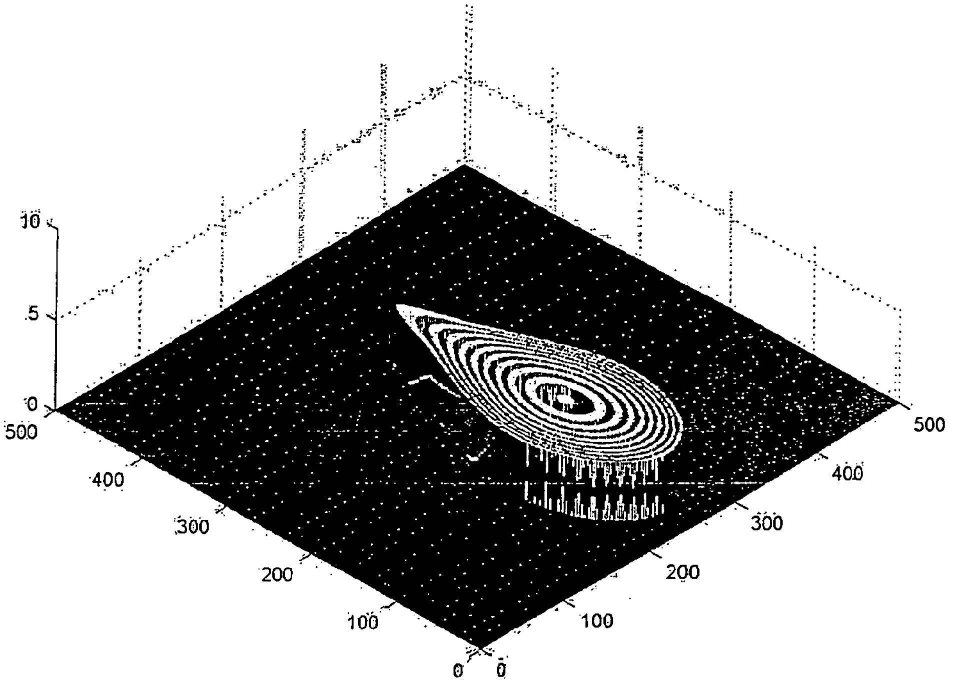
FIGS. 5*a* and 5*b* are views corresponding to FIGS. 3*a*, 3*b* and FIGS. 4*a*, 4*b* respectively but with the free-form element in the form of a diffractive binary structure.
Figure 5B:
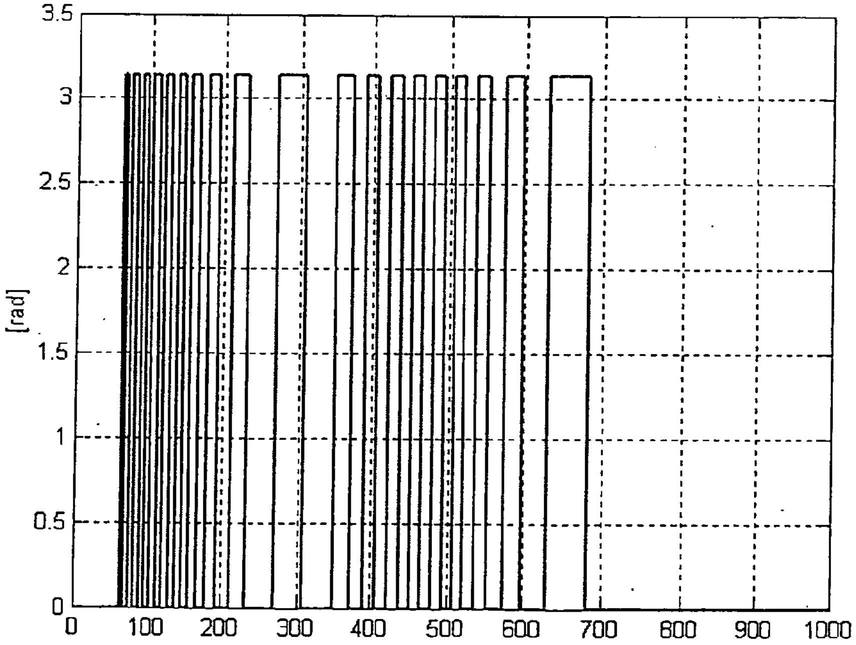
Figure 7C:
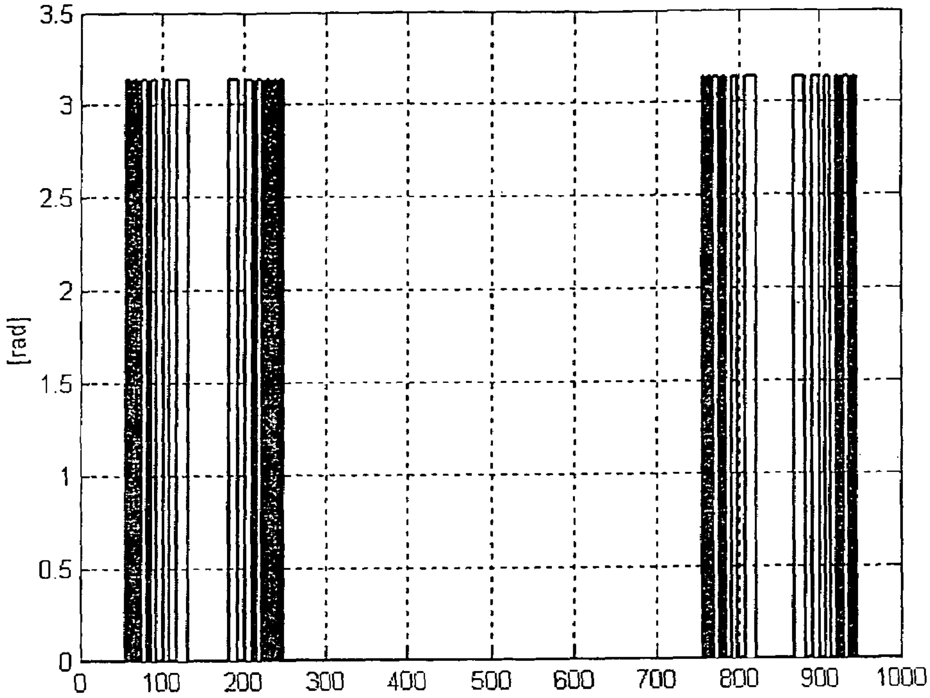

In connection with the drop-shaped free-form surface of FIGS. 3a and 4a respectively, FIG. 5a finally also shows a plan view when the free-form element is in the form of a binary grating, the resulting heightwise profile of the interface 3 being correspondingly shown in FIG. 5b. In regard to the annular and L-shaped free-form surface, a perspective view of the interface 3 when the free-form element is in the form of a binary structure has not been illustrated herein. The corresponding heightwise profiles are however shown in FIGS. 7c and 9c (for the annular and L-shaped free-form element respectively).

A corresponding comparison of FIGS. 3b, 6b and 8b with FIGS. 4b, 7b and 9b and FIGS. 5b, 7c and 9c respectively again shows the marked reduction in the height of the structures in regard to the transition from a refractive structure (FIGS. 3b, 6b, 8b) to a diffractive continuous grating structure (FIGS. 4b, 7b and 9b) and a binary structure (FIGS. 5b, 7c and 9c) respectively.

Finally FIG. 10 also shows an example of a more complex structure with free-form surfaces formed by free-form elements. This involves a weave or grid structure in which the mutually crossing threads 14 and 15 respectively are emphasised by virtue of being in the form of free-form elements according to the invention.

The described examples only involve comparatively simple embodiments which for example, like FIGS. 3 to 9, each include only one free-form element. It will be appreciated that it is possible to produce optically variable elements even with complex effects, by a suitable combination of different free-form elements, in which respect it is also possible in particular to provide, in addition to the lens-like free-form elements according to the invention, optically active structures, in particular diffractive structures, which generate effects of a completely different kind, for example motion effects, flips, image changes and so forth. It is also possible for the free-form elements or other diffractive structures to be combined with a thin-layer sequence, special layers (for example semiconductors) or with special colours, for example iridescing colours, in order in that way to achieve quite particular colour (change) effects. In that respect it is also possible for example for the free-form elements according to the invention to be combined or interleaved with other optically effective structures, for example in accordance with EP patent No 0 375 833 B1 or for a plurality of free-form surfaces to be combined together or interleaved with each other, so that, from the point of view of a viewer, the or a given lens-like free-form element or one or more other optically effective structures appear alternately, depending on the angle at which the corresponding substrate is viewed. A combination of the optically variable elements according to the invention with print elements, matt structures or specular surfaces is also possible.

Particularly attractive design configurations for the optically variable elements according to the invention can be achieved when the interface 3 forming the effective structure is provided only region-wise with a reflection-enhancing layer, in particular a metallisation, in which case for example demetallisation can be provided here in register relationship with the free-form elements. For example, in the embodiments of FIGS. 3a to 9a, it would be possible to provide in each case only the free-form element, that is to say the drop-shaped free-form surface 11 (in-FIGS. 3a, 4a and 5a), the ring element 12 (in FIGS. 6a and 7a) or the L-shaped element (in FIGS. 8a and 9a) with a metallisation in the region of the interface 3, but not the surrounding interface between the layers 1 and 2. The weave-like, optically variable element of FIG. 10 could also be of a more interesting configuration by virtue of partial metallisation, in which case for example only the surface regions of the interface 3 which form the threads 14, 15 could be metallised while there is no metallisation in the intermediate spaces between the threads 14, 15 so that in that respect the optically variable element would be transparent.

It should be mentioned that the interface 3 does not necessarily have to be delimited on both sides by a lacquer or adhesive layer. Particularly when using the optically variable element according to the invention in a transmission mode, the interface 3 could also adjoin air, whereby the refractive index difference, which is required in the region of the interface 3, in respect of the layers on both sides of the interface 3, could possibly be achieved in a simple fashion. Configurations of this kind are very suitable for example for packaging or wrapping films which are not fixed on a substrate.

Finally, precisely because it is relatively flat, an optically variable element can also be used in combination with printed elements, for example overprinted in a region-wise fashion.

What is claimed is:

1. An optically variable element comprising:

a surface portion having an interface which forms an optically effective structure, with respect to a reference surface the optically effective structure at least one of projects and is set back therefrom, wherein the optically effective structure has at least one free-form surface appearing three-dimensionally to a viewer, wherein the free-form surface is formed by a partial region of the interface, which is of a lens-like configuration and which produces a magnification or reduction effect and which forms a free-form element, wherein the free-form element includes a grating structure having grating lines substantially following contour lines of the free-form surface, wherein the grating structure includes grating grooves with first and second opposed flanks, the first flanks extending parallel to each other and substantially parallel to a normal to the reference surface, the second flanks disposed at an oblique angle with respect to the normal to the reference surface, wherein the oblique angle of each of the second flanks either increases or decreases progressively away from a central region of the free-form surface towards an edge thereof, thereby changing the spacing of the grating lines from the central region toward the edge.

2. An optically variable element according to claim 1, wherein the interface is embedded between two layers of a layer composite.

3. An optically variable element according to claim 2, wherein at least one of the layers enclosing the interface is coloured.

4. An optically variable element according to claim 1, wherein the free-form surface is in the form of a diffractive free-form element, wherein the grating structure has a grating depth of at most 10 μm.

5. An optically variable element according to claim 1, wherein the free-form surface appears to the viewer in the form of an alphanumeric character, a geometrical figure or another object.

6. An optically variable element according to claim 1, wherein the second flanks of the grating grooves are of a stepped configuration, wherein the second flanks are approximated in respect of their optical effect by the surfaces forming the steps.

7. An optically variable element according to claim 1, wherein the free-form surface is formed by a holographically produced free-form element.

8. An optically variable element according to claim 1, wherein the free-form surface is part of an optically effective overall structure arrangement which besides the free-form element includes partial regions with optically variable elements producing different optical effects for the viewer.

9. An optically variable element according to claim 1, wherein the optically effective structure is completely or region-wise combined with a thin-layer arrangement.

10. An optically variable element according to claim 1, wherein the interface forming the optically effective structure is provided at least region-wise with a reflection-enhancing coating.

11. An optically variable element according to claim 10, wherein the reflection-enhancing coating is formed by a metal layer.

12. An optically variable element according to claim 11, wherein the register relationship is produced by region-wise demetallisation of the interface.

13. An optically variable element according to claim 10, wherein the reflection-enhancing coating is provided in register relationship with the at least one free-form element.

14. Use of an optically variable element according to claim 1 as a security element to prevent forgery of value-bearing documents or for articles to be safeguarded.

15. Use according to claim 14, wherein the optically variable element is incorporated into a decorative layer arrangement, for transferring on to a substrate, of a transfer film.

16. Use according to claim 14, wherein the optically variable element is incorporated into a decorative layer arrangement of a laminating film.

17. An optically variable element comprising:

a plurality of surface portions forming an interface to produce an optically effective structure, the optically effective structure spatially projects from and/or is set back with respect to a reference surface, the optically effective structure including at least one free-form surface, the at least one free-form surface appearing to a viewer as a three-dimensional free-form element, wherein the at least one free-form surface is formed by a partial region of the interface, the at least one free-form surface having a lens-like configuration and produces at least one of a magnification and reduction effect and which forms the free-form element, wherein the free-form element includes a grating structure having grating lines substantially following contour lines of the free-form surface, wherein the spacing of the grating lines either increases or decreases progressively away from a central region of the free-form surface substantially to an edge thereof, wherein the grating structure of the free-form element is a binary structure having grating grooves and grating lands which are of substantially rectangular cross-section.

18. An optically variable element according to claim 17, wherein the free-form surface appears to the viewer in the form of an alphanumeric character, a geometrical figure or another object.

19. An optically variable element according to claim 17 wherein the depth of the grating grooves of the grating structure of the free-form element is approximately equal over the entire free-form surface.

20. An optically variable element according to claim 17 wherein the free-form element is in the form of a diffractive free-form element, the grating structure having a grating depth of at most 10 μm.

* * * * *

UNITED STATES PATENT AND TRADEMARK OFFICE

CERTIFICATE OF CORRECTION

PATENT NO. : 7,551,335 B2
APPLICATION NO. : 10/535909
DATED : June 23, 2009
INVENTOR(S) : Schilling et al.

It is certified that error appears in the above-identified patent and that said Letters Patent is hereby corrected as shown below:

| | | |
|---|---|---|
| Column 7, Line 31, | now reads | "the angle a between" |
| | should read | -- the angle α between -- |

Signed and Sealed this

Twenty-seventh Day of October, 2009

David J. Kappos
*Director of the United States Patent and Trademark Office*